United States Patent
Feng et al.

(10) Patent No.: US 11,704,808 B1
(45) Date of Patent: Jul. 18, 2023

(54) SEGMENTATION METHOD FOR TUMOR REGIONS IN PATHOLOGICAL IMAGES OF CLEAR CELL RENAL CELL CARCINOMA BASED ON DEEP LEARNING

(71) Applicant: WUXI SECOND PEOPLE'S HOSPITAL, Wuxi (CN)

(72) Inventors: Ninghan Feng, Wuxi (CN); Hong Tang, Wuxi (CN); Guanzhen Yu, Wuxi (CN); Jinzhu Su, Wuxi (CN); Yang Wang, Wuxi (CN); Yangkun Feng, Wuxi (CN); Peng Jiang, Wuxi (CN)

(73) Assignee: WUXI SECOND PEOPLE'S HOSPITAL, Wuxi (CN)

( * ) Notice: Subject to any disclaimer, the term of this patent is extended or adjusted under 35 U.S.C. 154(b) by 0 days.

(21) Appl. No.: 18/113,069

(22) Filed: Feb. 23, 2023

(30) Foreign Application Priority Data

Feb. 25, 2022 (CN) .......................... 202210181330.X

(51) Int. Cl.
| | | |
|---|---|---|
| *G06T 7/00* | (2017.01) | |
| *G06T 7/11* | (2017.01) | |
| *G06T 7/194* | (2017.01) | |

(52) U.S. Cl.
CPC .............. *G06T 7/11* (2017.01); *G06T 7/0012* (2013.01); *G06T 7/194* (2017.01); *G06T 2207/20021* (2013.01); *G06T 2207/20081* (2013.01); *G06T 2207/20084* (2013.01); *G06T 2207/30084* (2013.01); *G06T 2207/30096* (2013.01)

(58) Field of Classification Search
CPC ......... G06T 7/11; G06T 7/0012; G06T 7/194; G06T 2207/20021; G06T 2207/20081; G06T 2207/20084; G06T 2207/30084; G06T 2207/30096
USPC ....................................................... 382/133
See application file for complete search history.

(56) References Cited

U.S. PATENT DOCUMENTS

| 2015/0218643 A1* | 8/2015 | Lasseigne ............ C12Q 1/6886 |
| | | 506/9 |
| 2017/0122966 A1* | 5/2017 | Sabbisetti ........ G01N 33/57438 |
| 2018/0346566 A1* | 12/2018 | Rahimi .................... A61P 35/00 |

(Continued)

FOREIGN PATENT DOCUMENTS

| CN | 110738637 A | * | 1/2020 | ........... G06K 9/6282 |
| CN | 110738637 A | | 1/2020 | |

(Continued)

*Primary Examiner* — Van D Huynh
(74) *Attorney, Agent, or Firm* — Bayramoglu Law Offices LLC

(57) ABSTRACT

A segmentation method for tumor regions in a pathological image of clear cell renal cell carcinoma based on deep learning includes data acquisition and pre-processing, building and training of a classification network SENet and prediction of tumor regions. The present invention studies clear cell renal cell carcinoma based on pathological images, yielding results with higher reliability than judgments made based on CT or MRI images. The present invention overcomes the drawback that the previous research on clear cell renal cell carcinoma is only limited to judgment on presence by being able to visually provide the position and size of tumor regions, which is convenient for the medical profession to better study the pathogenesis and directions to the treatment of clear cell renal cell carcinoma.

2 Claims, 3 Drawing Sheets

(56) References Cited

U.S. PATENT DOCUMENTS

| | | | |
|---|---|---|---|
| 2019/0071508 A1* | 3/2019 | Yoshida | A61K 47/60 |
| 2019/0147592 A1* | 5/2019 | Yu | G06V 20/695 |
| | | | 382/128 |
| 2022/0047634 A1* | 2/2022 | Marasco | C07K 16/2875 |
| 2022/0093268 A1* | 3/2022 | Li | G16H 10/60 |
| 2022/0136059 A1* | 5/2022 | Czyzyk-Krzeska | |
| | | | C12Q 1/6886 |
| | | | 435/6.12 |
| 2022/0319008 A1* | 10/2022 | Bengtsson | A61B 5/4848 |
| 2022/0319638 A1* | 10/2022 | Hsieh | G16H 50/30 |
| 2022/0367053 A1* | 11/2022 | Mahmood | G16H 50/20 |
| 2022/0372573 A1* | 11/2022 | Liu | G16B 20/00 |
| 2022/0373535 A1* | 11/2022 | Nowak-Sliwinska | |
| | | | A61K 31/167 |
| 2023/0112866 A1* | 4/2023 | Serie | C12Q 1/6872 |
| | | | 435/7.1 |
| 2023/0126920 A1* | 4/2023 | Ci | G16B 20/00 |
| | | | 435/6.14 |

FOREIGN PATENT DOCUMENTS

| | | | |
|---|---|---|---|
| CN | 111488912 A | * | 8/2020 |
| CN | 111488912 A | | 8/2020 |
| CN | 111798416 A | * | 10/2020 |
| CN | 111798416 A | | 10/2020 |

\* cited by examiner

SEGMENTATION METHOD FOR TUMOR REGIONS IN PATHOLOGICAL IMAGES OF CLEAR CELL RENAL CELL CARCINOMA BASED ON DEEP LEARNING

CROSS REFERENCE TO THE RELATED APPLICATIONS

This application is based upon and claims priority to Chinese Patent Application No. 202210181330.X, filed on Feb. 25, 2022, the entire contents of which are incorporated herein by reference.

TECHNICAL FIELD

The present invention relates to an auxiliary method for medical diagnosis, and in particular to a segmentation method for tumor regions in pathological images of clear cell renal cell carcinoma based on deep learning.

BACKGROUND

The kidney, an important organ in the composition of the human urinary system, is capable of generating urine, performing re-absorption of nutrients and maintaining the relative stability of the internal environment of the body. Kidney cancer, ranked second in the tumors of the urinary system, accounts for about 2% to 3% of tumors in adults. Its increasing incidence and mortality over the years pose a serious threat to human health. Clear cell renal cell carcinoma, the most common tumor of kidney cancer, accounts for about 60% to 70% of renal tumors. As a reliable means of tumor detection, pathological images provide an effective way for further research and treatment of clear cell renal cell carcinoma.

In recent years, research on kidney cancer has mostly focused on the radiomics of kidney cancer using artificial intelligence methods. Lee H et al. identified clear cell carcinoma and angiomyolipoma through a combination of hand-crafted features and machine learning. Similarly, Feng et al. achieved the classification of the two types described above using a support vector machine method, and the classification accuracy was further improved. In addition, Erdim et al. achieved the classification of benign and malignant kidney cancers through the random forest method. With respect to research on kidney cancer based on pathological images, Kruk M et al. achieved the recognition of Fuhrman grades of clear cell carcinoma as early as 2014. In 2017, Dahao Lu et al. achieved the automated segmentation of nuclei in pathological images through a deep learning method. In 2020, Jun Cheng et al. achieved the classification of clear cell carcinoma and TFE3 renal cell carcinoma through four machine learning methods and obtained better results.

Although the studies described above show that artificial intelligence technology has been preliminarily studied and applied in kidney cancer, there remain the following defects: 1. the radiomics can be used as a means of detecting clear cell renal cell carcinoma in the early stage, but further confirmation based on pathological images is still required for its accurate identification; 2. the current research on pathological images of clear cell carcinoma mainly focuses on the grading of clear cell carcinoma or the classification of benign and malignant clear cell carcinomas; specific tumor regions cannot be provided; 3. since pathological images are large in size, the previous research is mainly grading or segmentation of nuclei based on small image blocks from large pathological sections; the automated identification of tumor regions cannot be achieved on pathological images in their entirety.

SUMMARY

The present invention aims to overcome the defects in the prior art by providing a segmentation method for tumor regions in pathological images of clear cell renal cell carcinoma based on deep learning. The method is capable of automatically segmenting tumor regions of clear cell carcinoma in pathological images of HE staining, assisting the medical profession in more readily and accurately determining the position and size of tumors and thus better helping determine a suitable treatment protocol for patients and lightening the burden on the medical profession.

According to the technical solutions provided by the present invention, the segmentation method for tumor regions in pathological images of clear cell renal cell carcinoma based on deep learning comprises the following steps:

a. data acquisition and pre-processing;
b. building and training of a classification network SENet; and
c. prediction of tumor regions.

Preferably, the step of data acquisition and pre-processing specifically comprises:

a1, converting original scanned images of HE sections of kidney cancer patients in kfb format to images in tiff format;

a2, marking tumor regions and non-tumor regions on the obtained images of HE sections in tiff format through ASAP software, then generating sampling points in the tumor regions and non-tumor regions at random, and generating image blocks of size 512×512 with these sampling points as centers;

a3, dividing the image blocks of HE sections into a training set, a validation set and a test set according to patients; and a4, performing image enhancement by random horizontal flipping and random rotation of all of the image blocks, and normalizing all of the image blocks using formula 1, wherein I(x) denotes a pixel value of an image block I at position x and I'(x) denotes an output at position x after normalization:

$$I'(x) = (I(x)-128)/128 \qquad \text{formula (1).}$$

Preferably, the step of building and training of a classification network SENet specifically comprises:

b1, first, feeding the normalized 512×512 image blocks to a convolution with a convolution kernel size of 7×7 to extract low-level features;

b2, then, learning high-level features from the image blocks through 4 cascaded residual blocks into which SE blocks are merged; and b3, finally, stretching the obtained features containing rich semantic information into one-dimensional feature vectors by global average pooling and finally obtaining predicted value outputs of a model through full-connected layers and a sigmoid function, wherein a predicted value of 0 indicates a non-tumor image and a predicted value of 1 indicates a tumor image.

Preferably, the step of prediction of tumor regions specifically comprises:

c1, first, obtaining a thumbnail of specific size through a get_thumbnail function in an openslide library;

c2, then, obtaining a foreground image with tissue from the thumbnail of the pathological image through maximum between-cluster variance method, denoted by mask1;

c3, then, dilating mask1 using structural elements of size 3×3 to fill some small holes left by threshold segmentation to obtain a binary image mask containing only a foreground of tissue, traversing coordinates $P_{mask}$ of each foreground pixel in the mask image and multiplying the coordinates by a scale factor by which the original image is scaled down to generate coordinates $P_{wsi}$ of a corresponding point in the original image; extracting from the original image a 512× 512 image block with the coordinates $P_{wsi}$ as a center and feeding the image block to the SENet previously trained to obtain a predicted value $y_{pred}$ and using $y_{pred}$ as a pixel value at $P_{mask}$ in mask, and generating preliminary tumor region results by traversing all pixels; and c4, finally, filtering out false positive regions from the preliminary segmentation results by constraining connected component area to obtain final segmentation results of tumor regions.

More preferably, in the SE blocks, the extracted features are processed by global average pooling to obtain features in a channel direction, and then the obtained features are squeezed and excited through full-connected layers to be restored to a one-dimensional vector corresponding with an input feature channel number; the one-dimensional vector will be updated with different values as a neural network is continuously optimized and iterated, wherein each value represents importance weight of a respective original feature image of the channel to a correct prediction made by the neural network; multiplying the weight obtained by channel attention by input features will yield enhanced features in the channel direction, thereby better promoting learning and convergence of the classification network.

More preferably, model parameters of SENet are optimized using an Adam optimizer with a learning rate of $10^{-4}$ in the process of training; a loss function is a function for expressing the distance between a predicted result and the actual label; the distance between the prediction result and the actual label is continuously reduced through the optimizer and a gradient descent method, such that the prediction result is getting closer to the label. In the present invention, the input images require binary classification (that is, determining whether the input images indicate tumors), and therefore binary cross-entropy is used to constrain the whole model. The calculation formula for the loss function loss is given below, where $y_{label}$ denotes the original label and $y_{pred}$ denotes the result predicted by the model.

$$\text{loss} = -(y_{label} \log y_{pred} + (1 - y_{label}) \log(1 - y_{pred})) \quad (2).$$

Compared with the prior art, the present invention has the following advantages:

(1) The present invention studies clear cell renal cell carcinoma based on pathological images, yielding results with higher reliability than judgments made based on CT or MRI images.

(2) The present invention overcomes the drawback that the previous research on clear cell renal cell carcinoma is only limited to judgment on presence by being able to visually provide the position and size of tumor regions, which is convenient for the medical profession to better study the pathogenesis and directions to the treatment of clear cell renal cell carcinoma.

(3) Starting with a general view of pathological images, the present invention automatically segments the tumor regions in the images, which is a breakthrough to the previous research on pathological image blocks, and is able to provide relatively complete and intelligent diagnoses.

DETAILED DESCRIPTION OF THE EMBODIMENTS

A specific embodiment of the present invention is detailed below.

The method of the present invention mainly comprises 3 steps: data acquisition and pre-processing, building and training of a classification network and prediction of tumor regions.

Data Acquisition and Pre-Processing

The present invention uses 230 HE digital sections of 69 patients of Wuxi Second People's Hospital from May 2020 to May 2021 as subjects. Each patient has 1 to 10 HE sections, and each HE section does not necessarily contain a tumor region. The present invention partitions the whole data set into a training set, a validation set and a test set by taking human as a unit. As the original digital scans of sections are in kfb format, they cannot be processed by computer. Therefore, the present invention uses the converter software provided by Konfoong to convert images in kfb format to images in tiff format. In addition, tumor regions and non-tumor regions are marked on each HE section through ASAP software under the direction of a medical professional, and then image blocks of size 512× 512 are randomly extracted from respective regions for ease of subsequent training in a classification network. The specific number of pictures is shown in Table 1.

TABLE 1

Quantity distribution of pictures among data sets

| | Number of patients | Number of sections | Number of tumor pictures | Number of non-tumor pictures | Total |
|---|---|---|---|---|---|
| Training set | 51 | 171 | 4709 | 5183 | 9892 |
| Validation set | 9 | 25 | 466 | 464 | 930 |
| Test set | 9 | 34 | 648 | 640 | 1288 |

Prior to training, image enhancement is performed by random horizontal flipping and random rotation (0°, 90°, 180° or 270°) of the original images to avoid overfitting. In addition, all of the images are normalized using formula 1 to accelerate the convergence of the network, where I(x) denotes a pixel value of an image block I at position x and I'(x) denotes an output at position x after normalization:

$$I'(x) = (I(x) - 128)/128 \qquad \text{formula (1)}$$

Building and Training of a Classification Network

Figure 1:
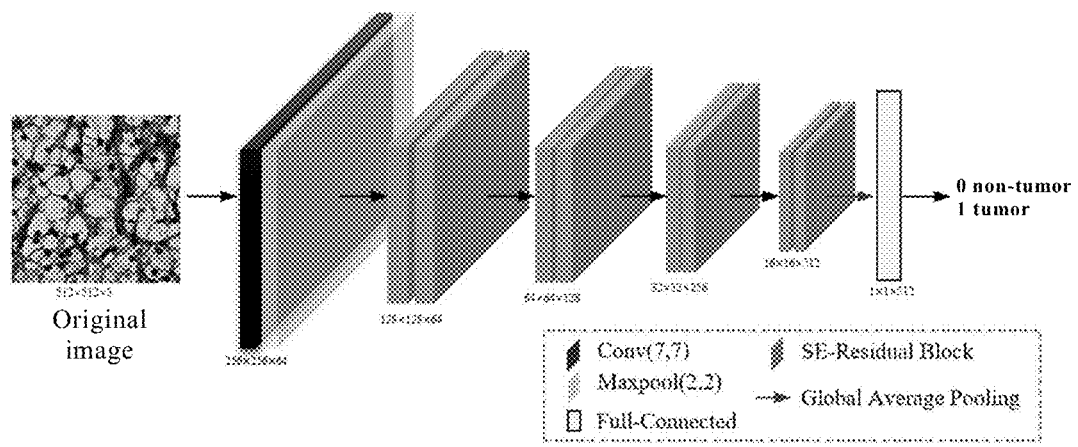
FIG. 1 is a graph showing the structure of the SENet network in the present invention.
Figure 2:
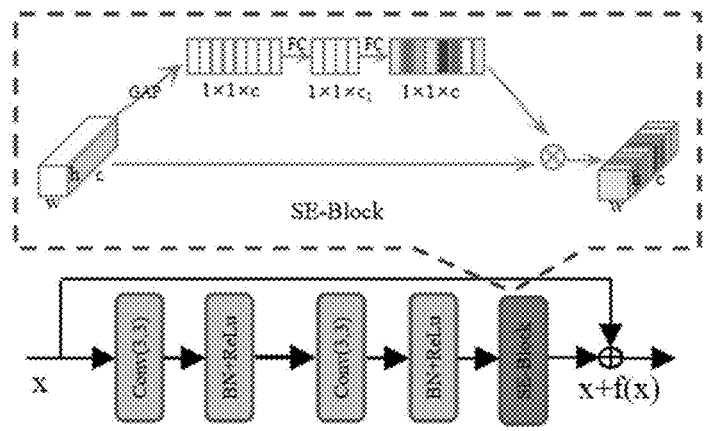
FIG. 2 is a graph showing the structure of the residual blocks into which SE blocks are merged in the present invention.

The data sets obtained in the previous step are fed to a SENet network for training; the specific training and experimental parameters are shown in the following steps:

a. The specific structure of the SENet network is shown in FIG. 1. First, the original 512×512 images are fed to a convolution with a convolution kernel size of 7×7 [Conv(7, 7)] and a pooling layer [Maxpool(2,2)] to extract low-level features. Then, the high-level features in the images are learned through 4 cascaded residual blocks into which SE blocks are merged (SE-residual blocks). Finally, the obtained features containing rich semantic information are stretched into one-dimensional feature vectors by global average pooling (GAP), and predicted outputs of the model are finally obtained through full-connected layers and a sigmoid function; a predicted value of 0 indicates a non-tumor image and a predicted value of 1 indicates a tumor image.

b. The SE-residual blocks are the original residual blocks into which SE blocks are merged (as shown in FIG. 2). A large number of experiments show that the combination of a convolution with a 3×3 kernel [Conv(3,3)], a BatchNormalization (BN) layer and a ReLU function can speed up the training of the network, increase the nonlinearity of network parameters and prevent overfitting. However, when the above-mentioned structure is only used to extract features, less gradient information can be transmitted to deep network layers as the number of network layers increases and redundant features are continuously removed by the pooling layer, which may lead to poor classification results. To avoid the gradient disappearance problem present in the process of network training, the residual blocks add the original feature x to the feature f(x) extracted by convolution, so that the information in the original feature is retained and a new feature beneficial to image classification is also added. The present invention adds SE blocks in the middle of the residual blocks, so that features extracted by the network have richer semantic information. The specific structure of the SE-Blocks is shown in the dashed box in the upper part of FIG. 2. The extracted features are processed by global average pooling (GAP) to obtain features in the channel direction, and then the obtained features are squeezed and excited through full-connected (FC) layers to be restored to a one-dimensional vector corresponding with the input feature channel number. The one-dimensional vector will be updated with different values as the neural network is continuously optimized and iterated; each value represents importance weight of a respective original feature image of the channel to a correct prediction made by the neural network. Multiplying the weight obtained by channel attention by input features will yield enhanced features in the channel direction, thereby better promoting learning and convergence of the classification network.

c. Optimization of the network model. Model parameters of SENet are optimized using an Adam optimizer with a learning rate of $10^{-4}$ in the process of training. A loss function is a function for expressing the distance between a prediction result and the actual label. The distance between the prediction result and the actual label is continuously reduced through the optimizer and a gradient descent method, such that the prediction result is getting closer to the label. In the present invention, the input images require binary classification (that is, determining whether the input images indicate tumors), and therefore binary cross-entropy is used to constrain the whole model. The calculation formula for the loss function loss is given below, where $y_{label}$ denotes the original label and $y_{pred}$ denotes the result predicted by the model.

$$\text{loss} = -(y_{label} \log y_{pred} + (1-y_{label})\log(1-y_{pred})) \quad \text{formula (2)}$$

Prediction of Tumor Regions

Figure 3:
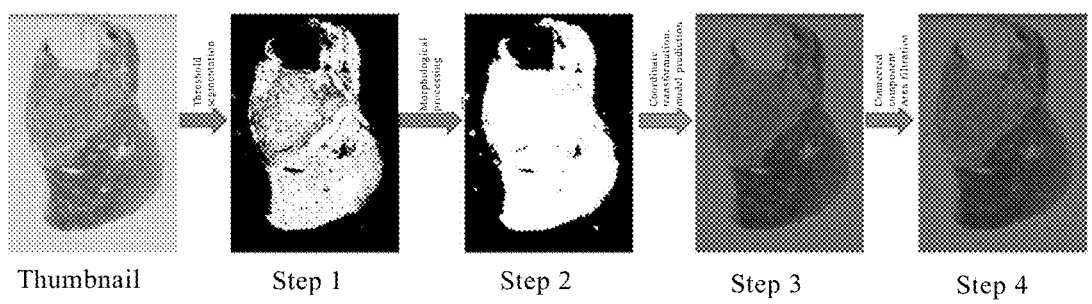
FIG. 3 is a graph showing the steps of predicting tumor regions of clear cell carcinoma in an HE image in the present invention.

After the training of the tumor classification network is completed, the present invention accomplishes the prediction of tumor regions through the following steps. A specific flow chart for prediction is shown in FIG. 3.

First, a thumbnail of specific size (the maximum length specified here is 512) is obtained through the get_thumbnail function in the openslide library, and then a foreground image with tissue is obtained from the thumbnail of the pathological image through threshold segmentation and is denoted by mask1. The reason for the segmentation of the thumbnail is that the original pathological image is large in size—about 100 thousand×100 thousand. Prediction based on the original image will consume a large amount of computational resources and is also time-consuming, and prediction is therefore performed based on a thumbnail of the original pathological image pixel by pixel.

Then, mask1 is morphologically processed (specifically, dilated using structural elements of size 3×3) to fill the holes present in threshold segmentation to obtain the label of a binary image mask containing only a foreground of tissue. Then, coordinate transformation is performed on the pixels of the foreground part in the mask image—that is, the coordinates $P_{mask}$ of each foreground pixel in the mask image is multiplied by a scale factor by which the original image is scaled down to go back to the coordinates $P_{wsi}$ of a corresponding point in the original image. A 512×512 image block with the $P_{wsi}$ coordinates as a center is extracted from the original image and fed to the SENet trained in step two for model prediction, and the prediction result is used as the pixel value at $P_{mask}$ in mask. Preliminary tumor region results are generated by traversing all pixels.

Finally, false positive regions with an area smaller than 200 pixels are filtered out from the preliminary segmentation results of tumor regions through a connected component area filtration method to obtain final tumor segmentation results.

Comparison of Experimental Results

The present invention compares the results of recognition of clear cell carcinoma and non-clear cell carcinoma pictures using a basic ResNet18 classification network and SENet; the two networks are both trained using the same training parameters and computer hardware configuration. In tests, indicators such as sensitivity (Sen), specificity (Spe), accuracy (Acc) and area under curve (AUC) of receiver operating characteristic curve (ROC) are used to measure the performance of network classification. Sen measures the performance of recognition of tumors by an algorithm. Spe measures the performance of recognition of non-tumor images by an algorithm. Acc is the recognition accuracy of an algorithm to all images in a test set. TP denotes the number of pictures that are actually tumor pictures and are correctly predicted as tumor pictures. FN denotes the number of pictures that are actually tumor pictures and are incorrectly predicted as non-tumor pictures. TN denotes the number of pictures that are actually non-tumor images and are correctly predicted. FP denotes the number of non-tumor pictures that are predicted as tumor pictures. Sen, Spe and Acc are then calculated as follows:

$$\text{Sen} = TP/(TP+FN) \quad \text{formula (3)}$$

$$\text{Spe} = TN/(TN+FP) \quad \text{formula(4)}$$

$$\text{Acc} = (TP+TN)/(TN+FN+TP+FP) \quad \text{formula (5)}$$

Figure 4:
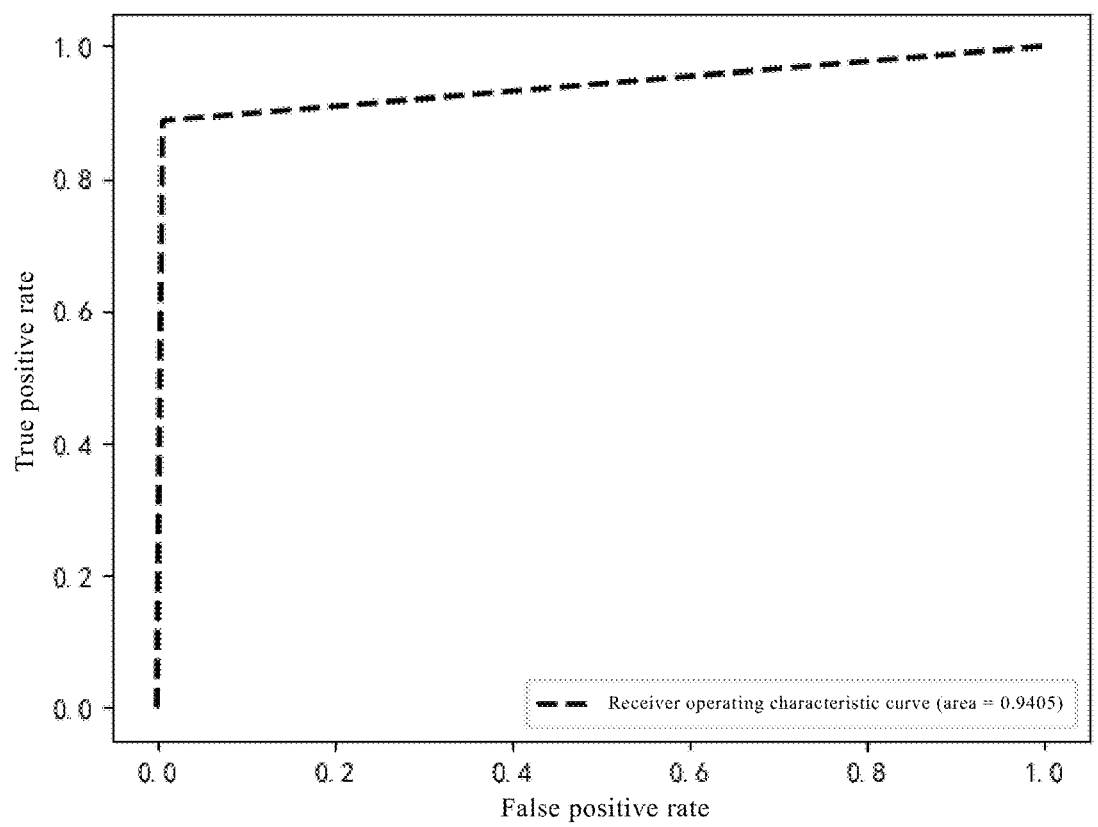
FIG. 4 is a graph showing a receiver operating characteristic curve of ResNet18.
Figure 5:
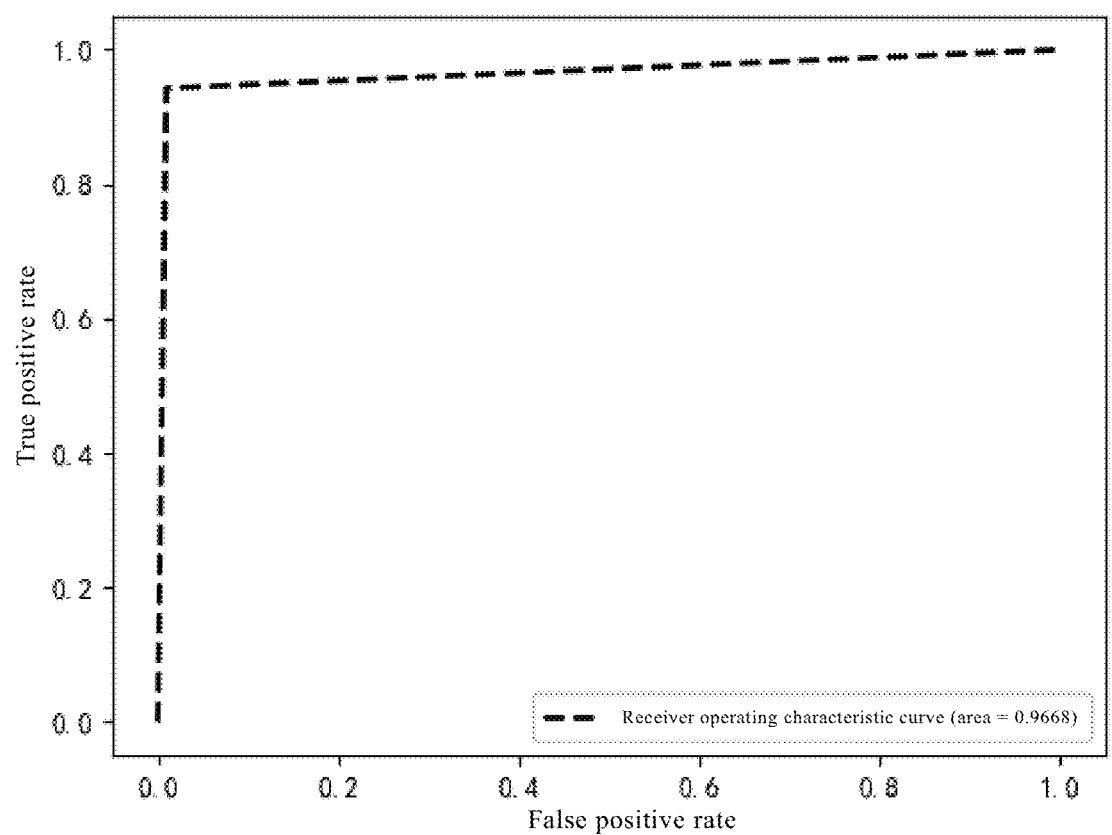
FIG. 5 is a graph showing a receiver operating characteristic curve of the SENet in the present invention.

ROC is a sensitivity curve with the true positive rate of the classifier as the ordinate and the false positive rate as the abscissa. The closer the curve is to the upper left corner, the higher the accuracy of the model is. The ROC curve of ResNet18 is shown in FIG. 4, and the ROC curve of SENet is shown in FIG. 5. As an extension of this, the area under ROC curve AUC is also used to judge the merits and demerits of a binary classification model. The specific numerical values of the classification indicators described above are shown in Table 2. It is easy to see that SENet has better classification performance after attention in the channel direction is introduced into the model.

TABLE 2

Classification results of ResNet18 and SeNet models

|  | Sen | Spe | AUC | Acc |
| --- | --- | --- | --- | --- |
| ResNet18 | 0.8873 | 0.9937 | 0.94 | 0.9402 |
| SeNet | 0.9429 | 0.9906 | 0.97 | 0.9666 |

What is claimed is:

1. A segmentation method for tumor regions in a pathological image of a clear cell renal cell carcinoma based on a deep learning, comprising the following steps:
   a, data acquisition and pre-processing, specifically comprising:
   a1, converting original scanned images of HE sections of kidney cancer patients in a kfb format to images in a tiff format;
   a2, marking tumor regions and non-tumor regions on the images of the HE sections in the tiff format through ASAP software, then generating sampling points in the tumor regions and the non-tumor regions at random, and generating image blocks of a size 512×512 with the sampling points as centers;
   a3, dividing the image blocks of the HE sections into a training set, a validation set, and a test set according to the kidney cancer patients; and
   a4, performing an image enhancement by a random horizontal flipping and a random rotation of the image blocks, and normalizing the image blocks using a formula 1, wherein I(x) denotes a pixel value of an image block I at a position x and I'(x) denotes an output at the position x after a normalization:

$I'(x)=I(x)-128)/128$      formula (1);

b, building and training of a classification network SENet, specifically comprising:
   b1, first, feeding normalized 512×512 image blocks to a convolution with a convolution kernel size of 7×7 to extract low-level features;
   b2, then, learning high-level features from the image blocks through 4 cascaded residual blocks, wherein SE blocks are merged into the 4 cascaded residual blocks; and
   b3, finally, stretching an obtained features containing a rich semantic information into one-dimensional feature vectors by a global average pooling and finally obtaining predicted value outputs of a model through full-connected layers and a sigmoid function, wherein a predicted value of 0 indicates a non-tumor image and a predicted value of 1 indicates a tumor image;
   c, a prediction of the tumor regions, specifically comprising:
   c1, first, obtaining a thumbnail of a specific size through a get_thumbnail function in an openslide library;
   c2, then, obtaining a foreground image with a tissue from the thumbnail of the pathological image through a maximum between-cluster variance method, denoted by a mask1;
   c3, then, dilating the mask1 using structural elements of a size 3×3 to fill some small holes left by a threshold segmentation to obtain a binary image mask containing only a foreground of the tissue, traversing coordinates $P_{mask}$ of each a foreground pixel in the binary image mask and multiplying the coordinates $P_{mask}$ by a scale factor by which a original image is scaled down to a thumbnail image to generate coordinates $P_{wsi}$ of a corresponding point in the original image; extracting from the original image a 512×512 image block with the coordinates $P_{wsi}$ as a center and feeding the 512×512 image block to the classification network SENet previously trained to obtain a predicted value $y_{pred}$ and using the predicted value $y_{pred}$ as a pixel value at the coordinates $P_{mask}$ in the binary image mask, and generating preliminary tumor region results by traversing all pixels; and
   c4, finally, filtering out false positive regions from preliminary segmentation results by a constraining connected component area to obtain final segmentation results of the tumor regions.

2. The segmentation method for the tumor regions in the pathological image of the clear cell renal cell carcinoma based on the deep learning according to claim 1, wherein in the SE blocks, extracted features are processed by the global average pooling to obtain features in a channel direction, and then the features in the channel direction are squeezed and excited through full-connected layers to be restored to a one-dimensional vector corresponding with an input feature channel number; the one-dimensional vector is updated with different values as a neural network is continuously optimized and iterated, wherein each value of the different values represents an importance weight of a respective original feature image of a channel to a correct prediction made by the neural network; multiplying a weight obtained by a channel attention by input features to yield enhanced features in the channel direction, thereby better promoting a learning and a convergence of the classification network SENet.

\* \* \* \* \*